United States Patent
Asai et al.

[11] Patent Number: 6,125,976
[45] Date of Patent: *Oct. 3, 2000

[54] DRUM BRAKE DEVICE

[75] Inventors: Seiji Asai, Okazaki; Yasushi Kobay, Nagoya, both of Japan

[73] Assignee: Nisshinbo Industries Inc., Tokyo, Japan

[*] Notice: This patent is subject to a terminal disclaimer.

[21] Appl. No.: 08/947,329

[22] Filed: Oct. 8, 1997

[30] Foreign Application Priority Data

Oct. 8, 1996 [JP] Japan ................................. 8-286123

[51] Int. Cl.⁷ ................................................. F16D 51/00
[52] U.S. Cl. ........................................ 188/328; 188/79.51
[58] Field of Search ............................. 188/79.51, 79.56, 188/328, 325

[56] References Cited

U.S. PATENT DOCUMENTS

| | | |
|---|---|---|
| 3,575,266 | 4/1971 | Sitchin . |
| 4,364,456 | 12/1982 | Colpaert . |
| 4,387,792 | 6/1983 | Imamura . |
| 5,042,623 | 8/1991 | Yamamoto ........................... 188/79.51 |
| 5,070,968 | 12/1991 | Evans ................................. 188/106 A |
| 5,275,260 | 1/1994 | Evans et al. ........................ 188/106 A |
| 5,360,086 | 11/1994 | Charmat . |
| 5,553,691 | 9/1996 | Mery et al. ............................. 188/338 |
| 5,720,367 | 2/1998 | Evans ..................................... 188/325 |
| 5,819,887 | 10/1998 | Asai et al. ........................... 188/79.51 |
| 6,003,645 | 12/1999 | Asai et al. .............................. 188/328 |

FOREIGN PATENT DOCUMENTS

| | | |
|---|---|---|
| 0 800 014 | 10/1997 | European Pat. Off. . |
| 0 836 027 | 4/1998 | European Pat. Off. . |
| 2 697 600 | 5/1994 | France . |
| 2 194 300 | 3/1988 | United Kingdom . |

OTHER PUBLICATIONS

Seiji Asai et al, U.S. Patent Application Serial No. 08/825,055, filed Mar. 27, 1997.

Primary Examiner—Robert J. Oberleitner
Assistant Examiner—Robert A. Siconolfi
Attorney, Agent, or Firm—Arent Fox Kintner Plotkin & Kahn, PLLC

[57] ABSTRACT

A drum brake device that functions as a leading-trailing (LT) type when the service brake is applied, and as a duo-servo (DS) type when the parking brake is applied, in which the automatic shoe clearance adjustment mechanism functions precisely for a prolonged period, thereby generating no strange noise. This mechanism also eliminate any impact load applied to any of the components, thus enabling a lighter device. The middle segment of a long link 11 is pivotable in the middle of the one brake shoe 2.

8 Claims, 15 Drawing Sheets

DRUM BRAKE DEVICE

BACKGROUND OF THE INVENTION

This invention relates to a drum brake device; more specifically, it relates to a drum brake device that functions as a leading-trailing (LT) type when the service brake is applied, and as a duo-servo (DS) type when the parking brake is applied.

This type of drum brake device has been disclosed in Australian patent number AU-B1-53 491/79 and U.S. Pat. No. 5,275,260. The basic brake functions are the same in both devices, and the structure will be explained with reference to FIG. 15. A pair of brake shoes b, c are provided on top of a back plate a. An anchor block d is provided between the one adjacent ends of each brake shoe, and a hydraulic cylinder g is provided between the other adjacent ends of each brake shoe. A parking lever j is pivoted on one end i of one brake shoe b, and an idler lever k is pivoted so as to swing on the other brake shoe c. The first and second rods l, m are provided between the two brake shoes b, c, wherein one end n of the first rod l engages with the parking lever j, and the other end o engages with the idler lever k; and one end p of the second rod m engages with one brake shoe b, while the other end q engages with the other brake shoe c and the idler lever k.

The brake action is explained as follows. When the driver steps on the brake pedal, the hydraulic cylinder g is pressurized, wherein the two brake shoes b, c spread open, with the point of abutment with the anchor block d as the fulcrum, to cause a frictional connection with the rotating brake drum, not shown in the diagram, in a leading-trailing braking action.

When the parking brake is applied, the parking lever j is pulled in the direction of the arrow X. The force of that action is transferred in sequence to the first rod l, idler lever k, and second rod m, wherein the one brake shoe b opens with the point of abutment with the anchor block d as the fulcrum to cause a frictional connection with the brake drum. Next, the idler lever k turns, with the point of abutment with the second rod m as the fulcrum, causing the pivot component of the idler lever k to press the other brake shoe c in the direction of the arrow Y to cause a frictional connection with the brake drum. At the same time, the reaction force of the parking lever j is being applied in the direction of the arrow Z on the one end i of the one brake shoe b.

If at this time, the torque is applied on the brake drum in the direction of arrow R (uphill or downhill), the friction force of the one brake shoe b is transferred to the second rod m, wherein its other end q presses against the other brake shoe c, supported by the anchor block d, in a duo-servo braking action. If the torque is applied on the brake drum in the opposite direction of arrow R, the friction force of the other brake shoe c is transferred to the second rod m, wherein its one end p is pressed against the one brake shoe b, supported by the anchor block d, in the same duo-servo braking action as above.

As is evident from this parking brake operation, if the other end q of the second rod m abuts the idler lever k and a gap exists between the other end q and the other brake shoe c, then when the shoe c rotates in the opposite direction of R, the piston of the hydraulic cylinder g is repelled to an amount equivalent to the gap. That is, the brake pedal is repelled which is not only disconcerting to the driver, but the pedal stroke increases in the next brake pedal application. Conversely, if the other end q of the second rod m abuts against the other brake shoe c and a gap exists between the other end q and the idler lever k, then the stroke of the parking lever j increases by an amount equivalent to this gap; that is, the stroke of the hand lever increases. From these perspectives, it is preferable that the gap between the other end q of the second rod m and either the other brake shoe c or the idler lever k be as small as possible.

Next, FIG. 16 illustrates the concept of the automatic shoe clearance device which is installed in the drum brake device of U.S. Pat. No. 5,275,260. The bent end y of the adjustment lever r is pivotable on the web of the brake shoe c, and one end of the upper arm s is connected to the groove of the upper strut t for their interaction. Another arm is connected to the star wheel u of the upper strut t. A spring w, stretched between the adjustment lever r and the pivot lever v, energizes the adjustment lever r in the counterclockwise direction, with the end y as the fulcrum.

Should the brake lining be worn causing the two brake shoes b, c to open by more than a prescribed value when the service brake is applied, the upper arm causes the star wheel u to rotate to automatically extend the entire length of the upper strut t, thereby maintaining a constant clearance between the brake shoes b, c and the brake drum z.

Problems to be resolved by this invention

The drum brake device as described above has need of improvement in the following areas:

When the idler lever k is pivoted to rotate on the other brake shoe c, it is very difficult to check the proper alignment of the components.

Applying the parking brake and the brake drum which is engaged with the wheels starts to rotate with the device in this state, both brake shoes, the rods, or struts and other components all turn in tandem, wherein one or the other brake shoe collides against the anchor block. The noise so generated is disconcerting to the driver. Additionally, this impact load applied repeatedly on the anchor block can diminish the structural strength of the components. Therefore, the strong but heavier materials were used in the conventional brakes.

In the conventional device as disclosed in the Australian Patent Number AU-B1-53 491/79, the cumulative effect of the tolerances of each component will be such that the idler lever could abut against the second rod or play could be generated. At the very least, gap will be generated when the service brake is applied. Accordingly, the idler lever could vibrate creating a strange noise when the vehicle is in motion or the service brake is applied. Again, this noise can be disconcerting to the driver.

Moreover, as the lining of the other brake shoe c gradually wears, there is a gradual shift in the point at which the second rod m contacts with the brake shoe c or the idler lever k. That is, as shown in FIG. 15, the amount of displacement $\delta$ of the brake shoe c at the pivot point of the brake shoe with the link, and the amount of displacement $\delta c$ and $\delta k$ of the brake shoe c and idler lever k respectively at the point of the contact with the second rod m are defined as follows:

$$\text{Brake shoe displacement} \overline{\delta}c = \frac{H1 + H2}{H1} \times \overline{\delta} \qquad \text{Formula(1)}$$

$$\text{Idler lever k displacement} \overline{\delta}k = \frac{H2 + H3}{H3} \times \overline{\delta}, \qquad \text{Formula(2)}$$

where

H1: Distance from anchor d to the brake center (pivot point of brake shoe c and idler lever k);

H2: Distance from the pivot point of the brake shoe and the idler lever k to the second rod m;

H3: Distance from the pivot point of the brake shoe and the idler lever k to the first rod l;

δ: Amount of lining wear (amount of displacement).

In this case, H3 is considerably smaller than H1, hence the displacement δk of the idler lever k will be considerably larger than the displacement δc of the brake shoe c. As a result, in the conventional device as disclosed in U.S. Pat. No. 5,275,260, as the lining wears, the adjustment lever becomes interlocked with the brake shoe and moves with its point of abutment with the support block as the fulcrum, while the pivot lever moves with its point of abutment with the lower strut as the fulcrum. This changes the energizing force of the adjustment spring energizing the adjustment lever, which has a negative effect on the automatic adjustment process when only a very minimal adjustment is required.

Moreover, in the conventional drum brake device, there are chances that the brake shoe bites the brake drum causing unusual dragging between the brake lining and the brake drum. As a result, the wheels may be locked creating a dangerous situation to the driver.

OBJECTS AND SUMMARY OF THE INVENTION

This invention was devised to resolve the aforementioned problems by providing a drum brake device that functions as a very stable leading-trailing (LT) type when the service brake is applied, and as a highly effective duo-servo (DS) type when the parking brake is applied.

To that end, it is the first object to provide a drum brake device in which by regulating the long link to turn in one direction with respect to the brake shoes, its engaging point with the shoe clearance adjustment device can be easily observed by a temporary assembly of the link and the brake shoe.

The second object is to provide a drum brake device in which the brake shoes do not separate from the anchor block, even when the parking brake is applied, in which case no noise is generated even when a torque is generated on the brake drum, thus eliminating any discomfort or anxiety for the driver.

The third object is to provide a drum brake device in which no impact load is applied to the anchor block, hence the strength of its periphery can be reduced to make the device lighter.

The fourth object is to provide a drum brake device in which an adjustment spring and other components that affect the automatic shoe clearance adjustment device move in tandem with the brake shoes, thereby enduring a constant clearance between the brake drum and the brake shoes, even as the linings wear out.

The fifth object is to provide a drum brake device which avoid the wheel being locked because of the brake shoe biting the brake drum or usual dragging occurring between the brake lining and the brake drum.

These and other objects are obtained in a drum brake device comprising certain particular structure. As indicated in claim 1, this invention is a drum brake device which comprises a back plate, two brake shoes provided to face each other on top of the back plate, a service brake actuator on the back plate between one pair of the first adjacent ends of the brake shoes, an anchor block on the back plate between the other pair of the second adjacent ends of the brake shoes, a shoe clearance adjustment device adjacent to the service brake actuator provided between the brake shoes, a parking brake actuator adjacent to the anchor, a long link having a middle segment pivotably mounted at a pivot point on the middle of one brake shoe, one end of the link and the other end of the link respectively, functionally engaged with the shoe clearance adjustment device and the parking brake actuator, wherein the long link operates in tandem with the one brake shoe when the service brake is applied.

As indicated in claim 2, this invention is a drum brake device in which the other end of the long link is energized to engage with the anchor.

As indicated in claim 3, this invention is a drum brake device in which a torque with the pivot component of the long link as the fulcrum is imparted in the same direction in which the one brake shoe opens with the anchor block as the fulcrum, and a means which regulates the rotation in which the link pivots is provided between the link and the one brake shoe.

As indicated in claim 4, this invention is a drum brake device wherein with the pivot point in a middle of the long link as the fulcrum, the resistance to spread open the second adjacent end of brake shoes on the other side is greater than the resistance to spread open the first adjacent end of brake shoes on the one side.

As indicated in claim 5, this invention is a drum brake device wherein the moment applied to the second adjacent ends of the brake shoes, which is a combination of the force of a second shoe return spring and the distance from the pivotal mount of the brake shoe with the link to the second shoe return spring, is greater than the moment applied to the first adjacent ends of the brake shoes, which is a combination of the face of the first shoe return spring and the distance from the pivotal mount to the first shoe return spring.

As indicated in claim 6, this invention is a drum brake device wherein the shoe return spring means comprises a shoe return spring which engages and urges both brake shoes together at a position between the central region of the brake shoes and the second adjacent ends.

As indicated in claim 7, this invention is a drum brake device in which the shoe clearance adjustment device senses an amount by which the pair of brake shoes has opened and automatically adjusts the clearance between the brake shoes and a brake drum.

As indicated in claim 8, this invention is a drum brake device wherein a protuberance is integrally press-formed on the long link or the central region of one brake shoe at the pivot point and is pivotally engaged in a hole respectively bored at the pivot point in the one brake shoe or the link.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

EXAMPLE 1

Figure 1:
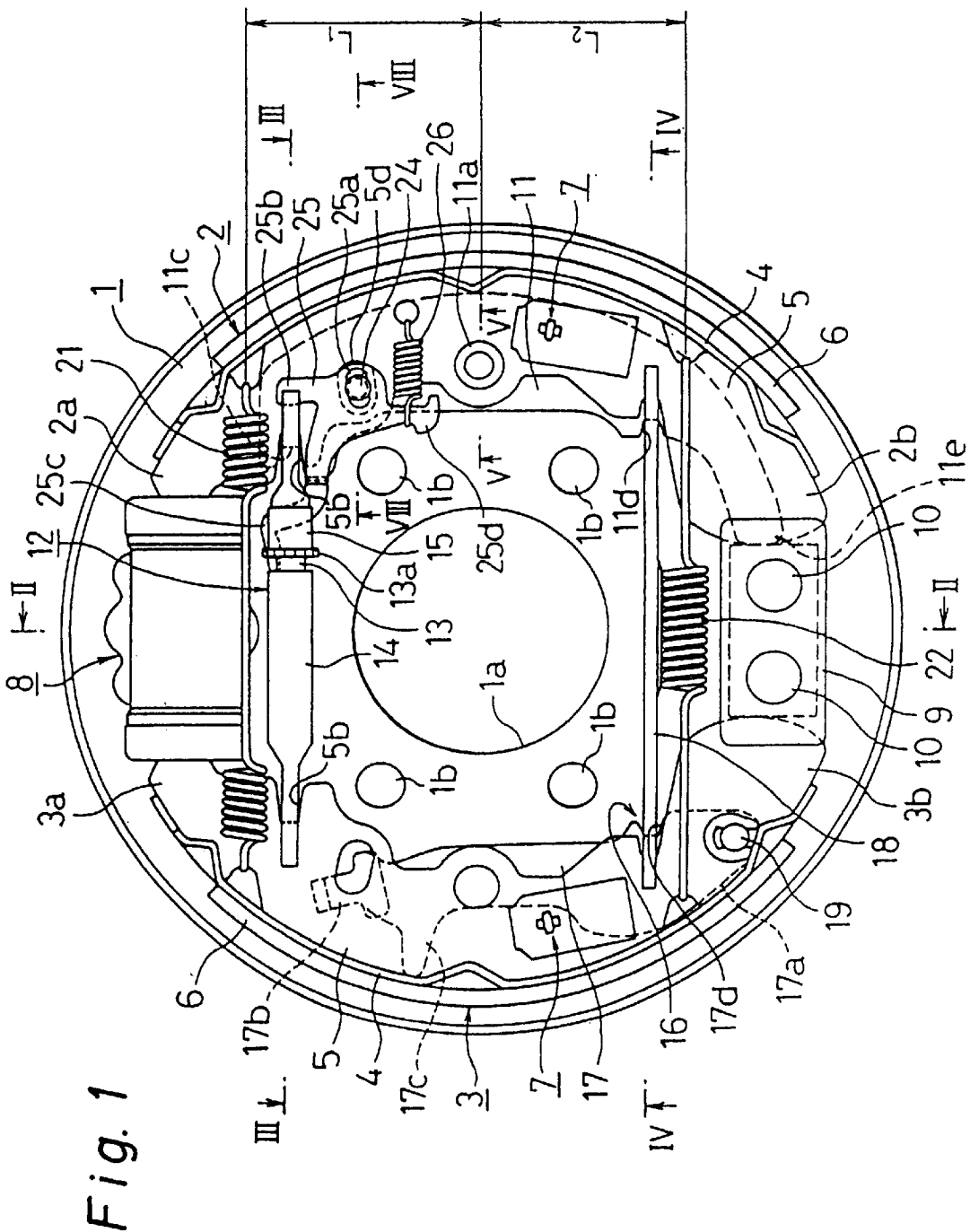
FIG. 1 is a plan view of the drum brake device of this invention as embodied in Example 1 and Example 3.
Figure 2:
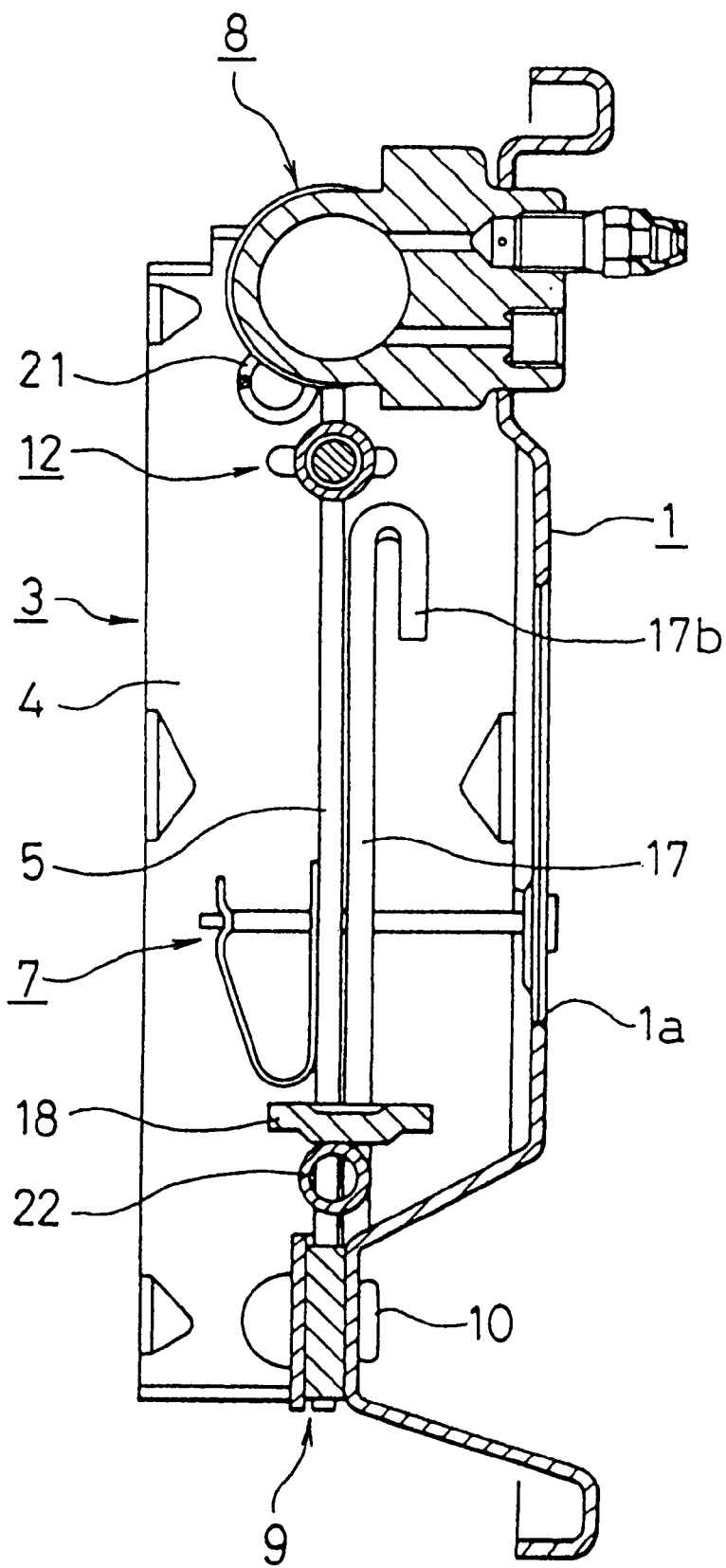
FIG. 2 is a cross section view of FIG. 1 taking along line II—II.

The overall configuration of the first embodiment is shown in FIGS. 1–6.

The central hole la of the back plate 1 is freely inlaid in the vehicle axle, and the back plate is affixed to a stationary part of the vehicle by four bolts inserted through the bolt holes 1b. A pair of brake shoes 2, 3, are provided to face oppositely to each other. Each shoe comprises a shoe rim 4, a shoe web 5 joined to the rim 4 to form a "T" in cross section, and lining 6 affixed around the perimeter of the shoe rim 4. Friction created s the linings are forced against the brake drum (not shown in the diagram) produces the braking action. The brake shoes 2, 3 are each mounted on top of the back plate 1 by a shoe-hold mechanism 7, 7 each comprised of a known plate spring and pin.

A service brake actuator 8, activated when the service brakes are applied, is provided between one pair of adjacent ends 2a, 3a of the pair of oppositely-facing brake shoes 2, 3, and is affixed to the back plate 1 with bolts or other hardware. A known hydraulic wheel cylinder is widely used as an actuator, but an air wheel cylinder can be used.

An anchor block 9 is provided between the other pair of adjacent ends 2b, 3b of the two brake shoes 2, 3. The anchor block 9 is normally affixed on top of a raised segment of the back plate 1 by two rivets 10, 10 but it can be welded if desired. Moreover, an anchor pin can be used in place of the rectangular plate. In either case, the anchor must support each of the other adjacent ends 2b, 3b of the brake shoes 2, 3.

A long link 11 is set under the shoe web 5 of one brake shoe 2.

A protuberance 11a, formed as burrs with a press, is formed in the central region of the link 11, and slips into the hole 5a bored in the shoe web 5. As shown in FIG. 1, a notched groove 11c, 11d is formed in the upper and lower segment of the link 11 respectively. The lower segment of the link 11 is extended from the notched groove 11d, wherein the bottom face 11e abuts against the anchor block 9.

Figure 5:
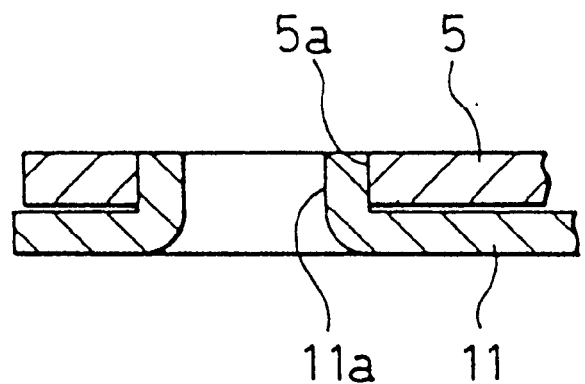
FIG. 5 is a cross section view of FIG. 1 taken along line V—V.
Figure 6:
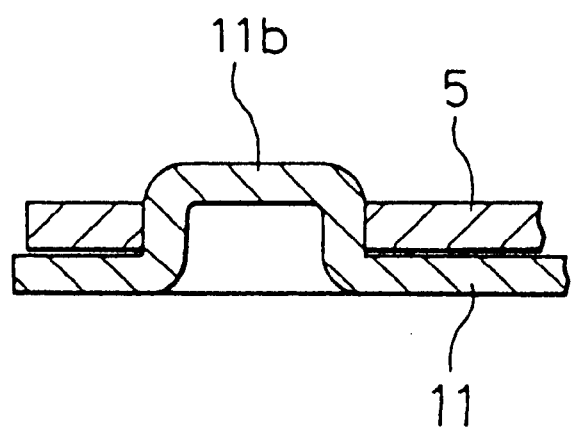
FIG. 6 illustrates a modified example of FIG. 5.

FIG. 5 illustrates the shape of the protuberance 11a; however, it can also be formed as drawing with a press to be an inverse U-shaped protuberance 11b as shown in FIG. 6. Either of the protuberances 11a or 11b is integrally formed by a press with the long link 11, but a protuberance is integrally formed with the shoe web 5, and slips into the hole bored in the link, or a separate pin can be easily used to support the long link 11 so as to be pivotable on the shoe web.

Figure 3:
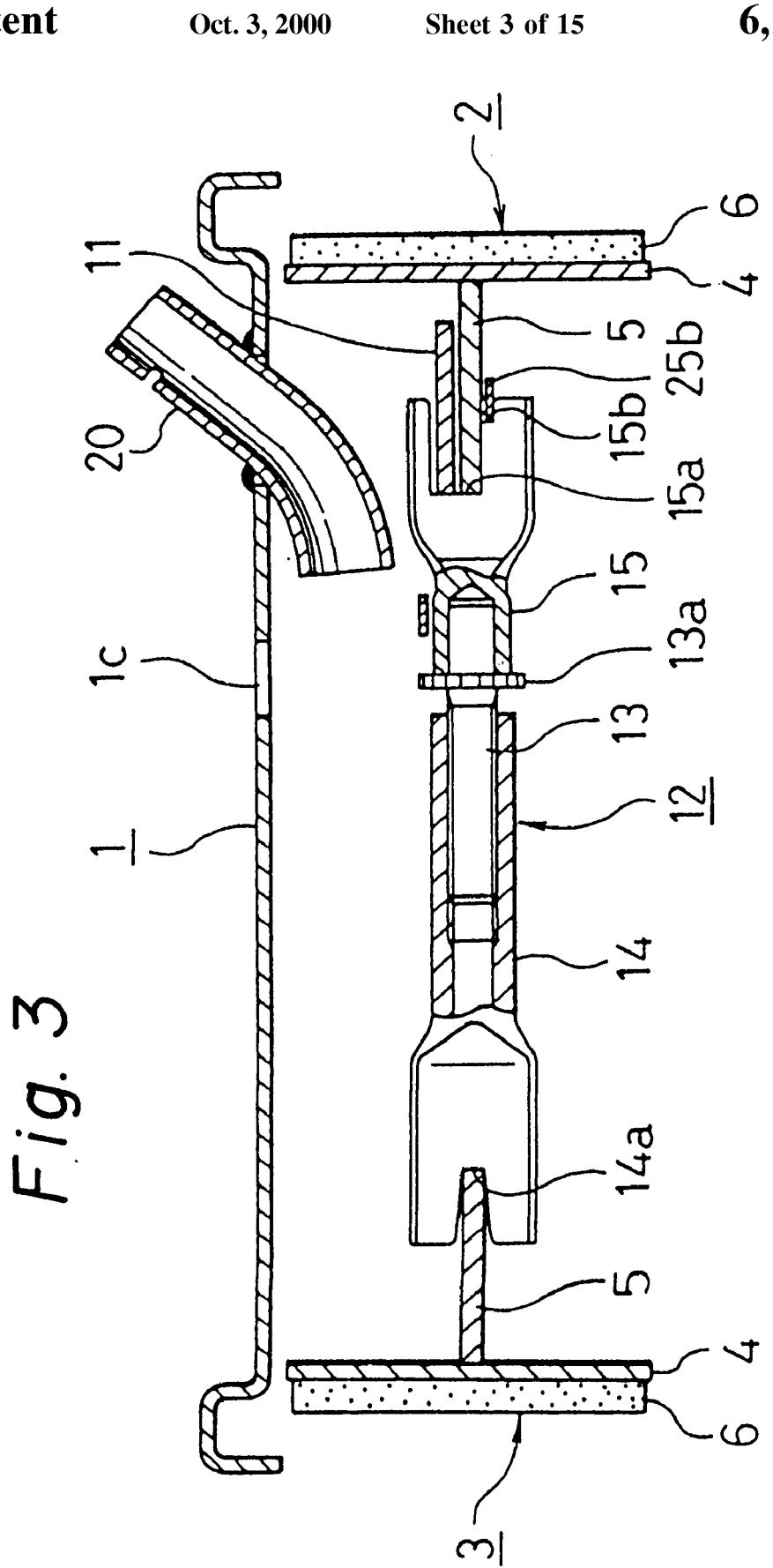
FIG. 3 is a cross section view of FIG. 1 taken along line III—III.

A shoe clearance adjustment device 12, of a known screw type shown in FIG. 3, adjusts the clearance between the brake drum, and the brake shoes 2, 3. These diagrams illustrate an automatic shoe clearance adjustment device, to be described later. However, a screw driver can be inserted into the hole 1c, bored in the back plate 1 or the hole bored in the brake drum (not shown), to turn the toothed adjustment wheel 13a which is integrally formed onto the bolt 13. Screwing the toothed adjustment wheel 13a into or out of the tube segment 14 will manually adjust the entire length of the shoe clearance adjustment device 12.

A socket 15 supports one end of the bolt 13. A thin plate tip is formed on the end of the tube segment 14 and the end of the socket 15. The socket 15 and the tube segment 14 engage the brake shoes 2, 3 respectively, with a notched groove 14a, 15a formed in each plate tip respectively. The bottom of the notched groove 14a abuts against the bottom of the notched groove 5b formed on the shoe web 5 of the other brake shoe 3; while the bottom of the notched groove 15a abuts against the bottom of the notched groove 5b formed with the shoe web 5 of one brake shoe 2 and the bottom of the notched groove 11c on the one end of the long link 11 as shown in FIG. 1. In reality however, there will be a minimal gap, equivalent to the cumulative effect of the tolerances in fabricating the brake shoe 2, long link 11, and other components, at the bottom of the notched groove 1c of the long link 11.

The parking brake actuator 16 is activated, when the parking brake is applied, and comprises a forward-pull brake lever 17, a strut 18, and other components. The brake lever 17 is superimposed on the shoe web 5 of the other brake shoe 3. The base end 17a is pivotable on a pin 19 on the other end 3b of brake shoe 3. A U-shaped groove, onto which is latched the remote control cable (not shown in the diagram) is formed on the free end 17b. A stopper 17c abutting against the inner face of the shoe rim 4 regulates the return position of the brake lever 17 when the parking brake is not activated.

Figure 4:
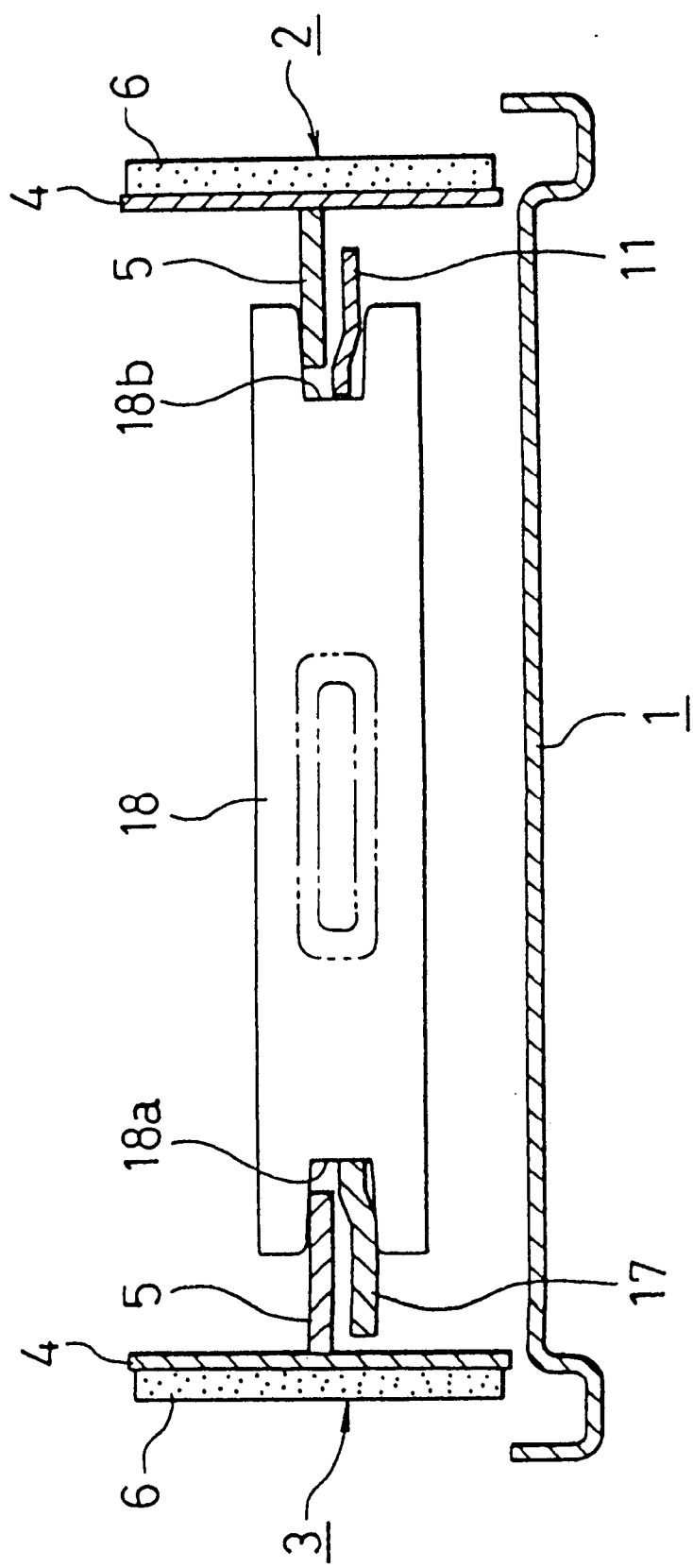
FIG. 4 is a cross section view of FIG. 1 taken along line IV—IV.

Notched grooves 18a, 18b are formed on either end of the plate strut 18 as shown in FIG. 4. The bottom of the notched groove 18a abuts against the bottom of the notched groove 17d in the brake lever 17; the bottom of notched groove 18b abuts against the bottom of a notched groove 11d formed in the other end of the long link 11 with a slight gap. This gap arises from the tolerances in fabricating the brake lever 17, strut 18, and other components, but it can be absorbed when attaching the remote control cable (not shown in the diagram).

As shown in FIG. 3, a pipe 20 can serve as the outer casing of the remote control cable (not shown in the diagram). The outer casing of the cable is affixed to the back plate 1.

As shown in FIG. 1, an upper or first shoe return spring 21, positioned adjacent to the service brake actuator 8 activated when the service brake is applied, is stretched between the one pair of adjacent ends 2a, 3a of the two brake shoes 2, 3. A lower or second shoe return spring 22, positioned adjacent to the anchor block 9, is stretched between the other pair of adjacent ends 2b, 3b of the two brake shoes 2, 3. The mounted loads of the shoe return springs are determined such that the ends of the brake shoes 2, 3 on the anchor block 9 side do not spread apart. That is, the first and second shoe return springs 21, 22 are selected so as to satisfy the following relational formula for the respective moment acting on the brake shoes 2, 3:

$$F1 \times L1 < F2 \times L2,$$

where

F1 Mounted load of first return spring 21;

F2 Mounted load of second return spring 22;

L1 Distance from the pivot point of brake shoe 2 with link 11 to the first return spring 21;

L2 Distance from the pivot point of brake shoe 2 with link 11 to the second return spring 22.

When the driver steps on the brake pedal, the service brake actuator 8 is pressurized and extends. The one ends 2a, 3a of both brake shoes 2, 3 spread open, with the point of abutment of the other ends 2b, 3b with the anchor block 9 as the fulcrum. This forces the linings 6, 6 against the rotating brake drum, and the friction so created will brake the vehicle. At this time, either brake shoe 2 or brake shoe 3 has a self-servo function while the other does not, hence the drum brake device functions as a leading-trailing type.

The operation of the parking brake is explained next, with each component turning in the direction as shown in FIG. 1. For example, when the hand brake lever is pulled, the free end 17b of the brake lever 17 is pulled to the right by the remote control cable (not shown in the diagram). At this point, the lever 17 turns clockwise with the pin 19 on which the free end 17a pivots as the fulcrum and presses against the strut 18. As the strut 18 presses against the notched groove 11d of the other end of the long link 11, the link 11 turns counterclockwise, with its protuberance 11a as the fulcrum. The force is transferred to the notched groove 5b of the other brake shoe 3 via the shoe clearance adjustment device 12, wherein the one end 3a of the brake shoe 3 spreads open, with the other end 3b as the fulcrum and is pressed against the brake drum.

Moreover, as the brake lever 17 is pulled, a force is generated to turn the long link 11 counterclockwise, with the one notched groove 11c abutting the shoe clearance adjustment device 12 as the fulcrum, and the action force is transferred to the hole 5a of the one brake shoe 2 by the protuberance 11a. At this point, the torque from the mounted load of the second return spring 22 is large, whereby the brake shoe 2 also opens with its other end 2b as the fulcrum, and is pressed against the brake drum.

If at this point a clockwise torque is applied on the brake drum, then the friction force of the other brake shoe 3 is transferred to the one brake shoe 2 via the shoe clearance adjustment device 12, wherein the other end 2b of the brake shoe 2 is supported by the anchor block 9 to generate a braking force. Hence the drum brake device functions as a duo-servo type in which both brake shoes 2, 3 have a self-servo function.

If a counterclockwise torque is applied on the brake drum, then the friction force of the one brake shoe 2 is transferred to the other brake shoe 3 via the shoe clearance adjustment device 12, wherein the other end 3b of the brake shoe 3 is supported by the anchor block 9 to generate a braking force. Again the drum brake device functions as a duo-servo type in which both brake shoes 2,3 have a self-servo function.

As is evident from this explanation, the brake shoes 2, 3 do not separate from the anchor block 9 until the brake drum rotates when the parking brake is applied or when the service brake is applied. The effect is obviously the same when both brakes are applied together. Accordingly, the other adjacent end 2b or 3b of the brake shoe 2 or 3 respectively does not collide with the anchor block 9 to generate any noise, nor is an impact load applied to the anchor block. That is, the effect differs from the prior art, in which when the parking brake is applied, the brake shoes 2, 3 will open completely wherein the other adjacent ends 2b, 3b will separate from the anchor block 9, thus generating a noise when the brake drum starts to rotate and applying an impact load to the anchor block. In addition, the adjacent ends 2b, 3b will not be separated from the anchor block 9 even in the situation that the brake lever 17 is not set its return position precisely, thereby maintaining the stability of the brake shoes 2,3 while driving.

EXAMPLE 2

Figure 7:
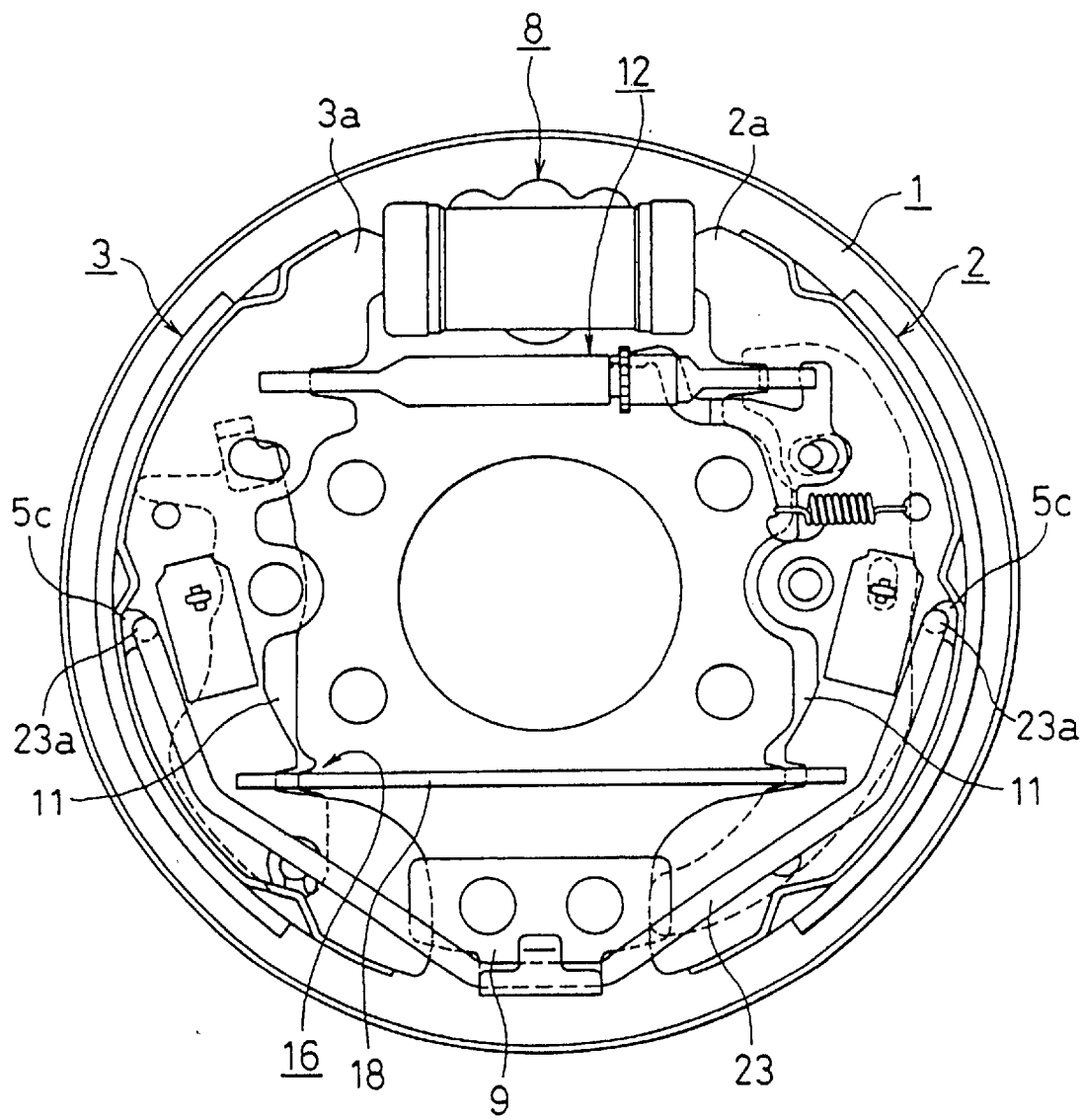
FIG. 7 is a plan view of the drum brake device of this invention as embodied in Example 2.

FIG. 7 illustrates Example 2, another embodiment of this invention, in which the shoe return springs have been modified. Otherwise, all other components are virtually the same as in Example 1, and are identified with the same symbol wherein an explanation is omitted here.

That is, the two return springs 21, 22 as shown in FIG. 1 are replaced with one shoe return spring 23, a fairly thick wire spring configured in the shape of a slightly obtuse U. The middle segment of the wire spring 23 is mounted on top of the anchor block 9, and the two free ends 23a, 23a are bent so as to latch in the holes 5c, 5c bored on the anchor block side in the two brake shoes 2, 3. The wire spring 23 should be stretched in a location such that when the parking brake is applied, the one ends 2a, 3a of the brake shoes 2, 3 will open.

The configuration of the shoe return spring is not limited to that shown in Example 1 or Example 2. A variety of shapes and configurations can be used, such as splitting the second return spring into two segments as configured in one conventional device.

EXAMPLE 3

Figure 8:
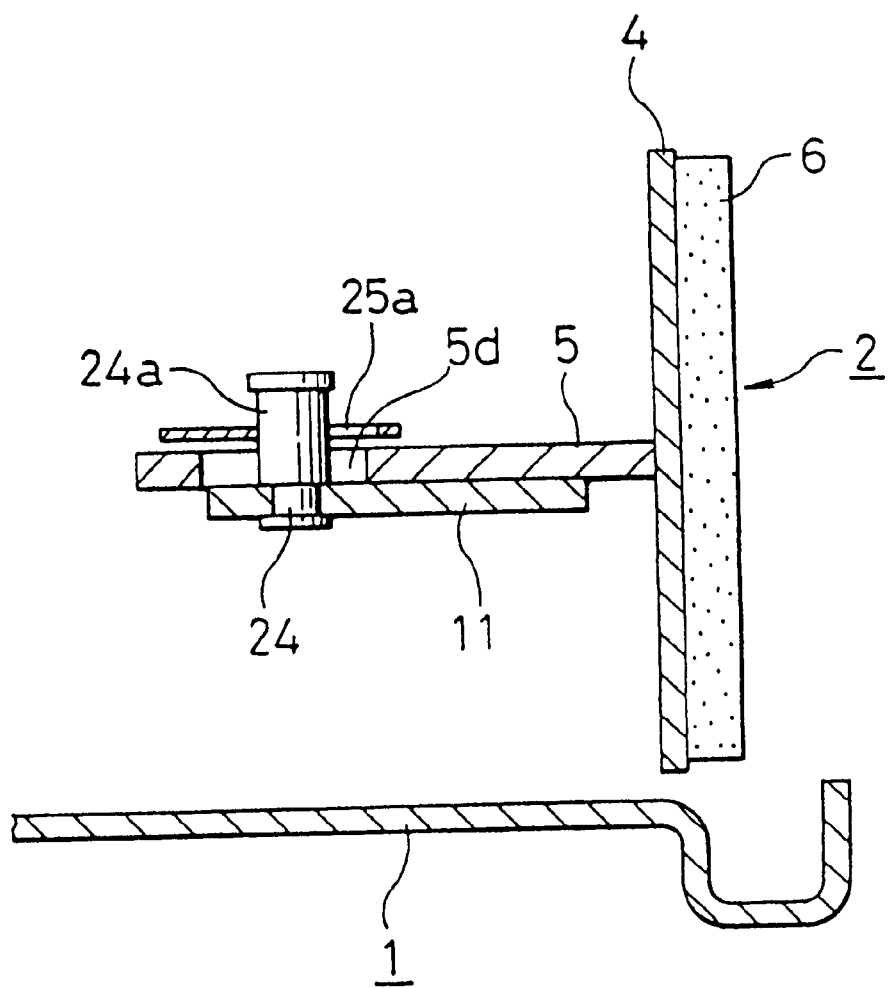
FIG. 8 is a cross section view of FIG. 1 taken along line VIII—VIII for the drum brake device of this invention as embodied in Example 3.

Example 3 is another embodiment of this invention shown in FIG. 1, 3, and 8 which is equipped with an incremental type of automatic shoe clearance adjustment device which is activated when the service brake is applied.

A pin 24 affixed on the one end side of the long link 11 freely penetrates through a slot 5d bored in the shoe web 5 of one brake shoe 2 and a hole 25a, provided in the middle of the adjustment lever 25. The adjustment lever 25 is pivotable around the stem component 24a which protrudes above the hole 5d. One arm 25b of the adjustment lever 25 abuts against the stepped face 15b of the notched groove 15a of the socket 15, while the other arm 25c is engages the toothed adjustment wheel 13a of the adjustment bolt 13.

Alternatively, the pin 24 can be affixed to the shoe web 5, and the adjustment lever 25 can pivot on the stem component 24a of the pin 24.

An adjustment spring 26 is stretched between another arm 25d of the adjustment lever 25 and the shoe web 5. As shown in FIG. 1, the adjustment spring 26 is energized so as to turn the adjustment lever 25 counterclockwise with the pin 24 as the fulcrum.

When the service brake is applied and the two brake shoes 2, 3 spread open, the automatic shoe clearance adjustment device 12 trails the other brake shoe 3. The long link 11 trails the one brake shoe 2. At that time, the other arm 25c of the adjustment lever 25 is turned counterclockwise with the pin 24 as the fulcrum as shown in FIG. 1 in an amount equivalent to the sum of the degree of movement of the pin 24 and the amount of movement of the automatic shoe clearance adjustment device.

At this point, if the linings 6, 6 are worn, and the degree of rotation of the other arm 25c of the adjustment lever 25 exceeds the intertooth pitch of the toothed adjustment wheel 13a, the bolt 13 is rotated to be screwed out of the tube segment 14. This automatically adjusts the gap between the brake drum and the linings 6, 6 to maintain a constant clearance.

When the parking brake is applied, the automatic shoe clearance adjustment device 12, the notched groove 11c side of the long link 11, the adjustment lever 25, and other components all trail in tandem with the other brake shoe 3 just by the amount it opens. However, with the one brake shoe 2, the pin 24 is freely inlaid to move within its slot 5d; hence, it has no effect on the adjustment lever 25. As a result, any automatic adjustment action will not be less than the movement of the adjustment lever 25 when the service brake is applied.

As is evident from this configuration, the biasing force of the adjustment spring 26 constantly acts on the long link 11 to abut its lower face 11e against the anchor block 9, even when the service brakes are released; hence the link 11 will not vibrate when the vehicle is in motion.

EXAMPLE 4

The previous embodiment clearly shows that the required functions can be obtained with a configuration in which the long link 11 spreads open in tandem with the one brake shoe 2. This example will explain a modified version of that embodiment.

Figure 9:
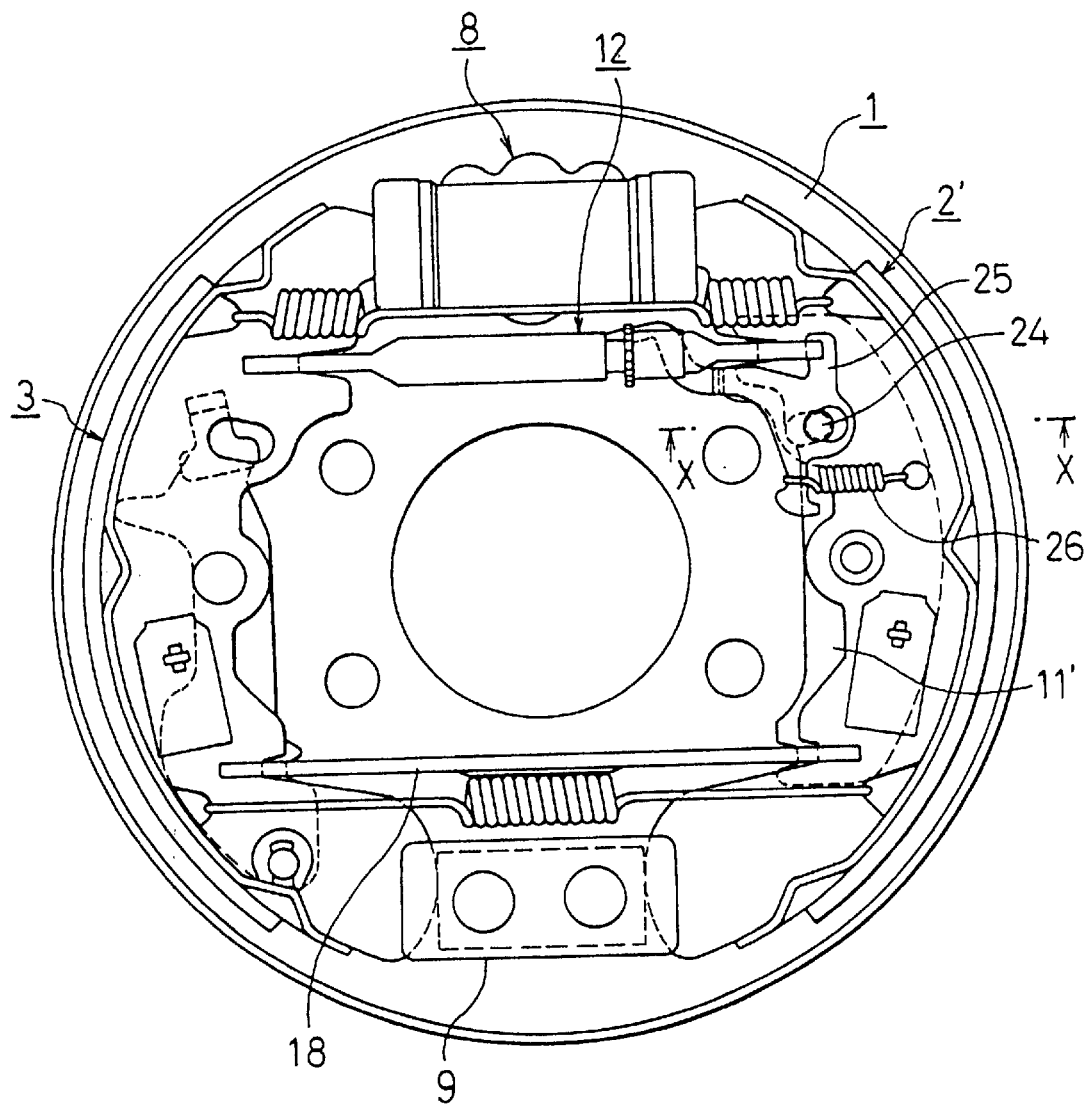
FIG. 9 is a plan view of the drum brake device of this invention as embodied in Example 4.
Figure 10:
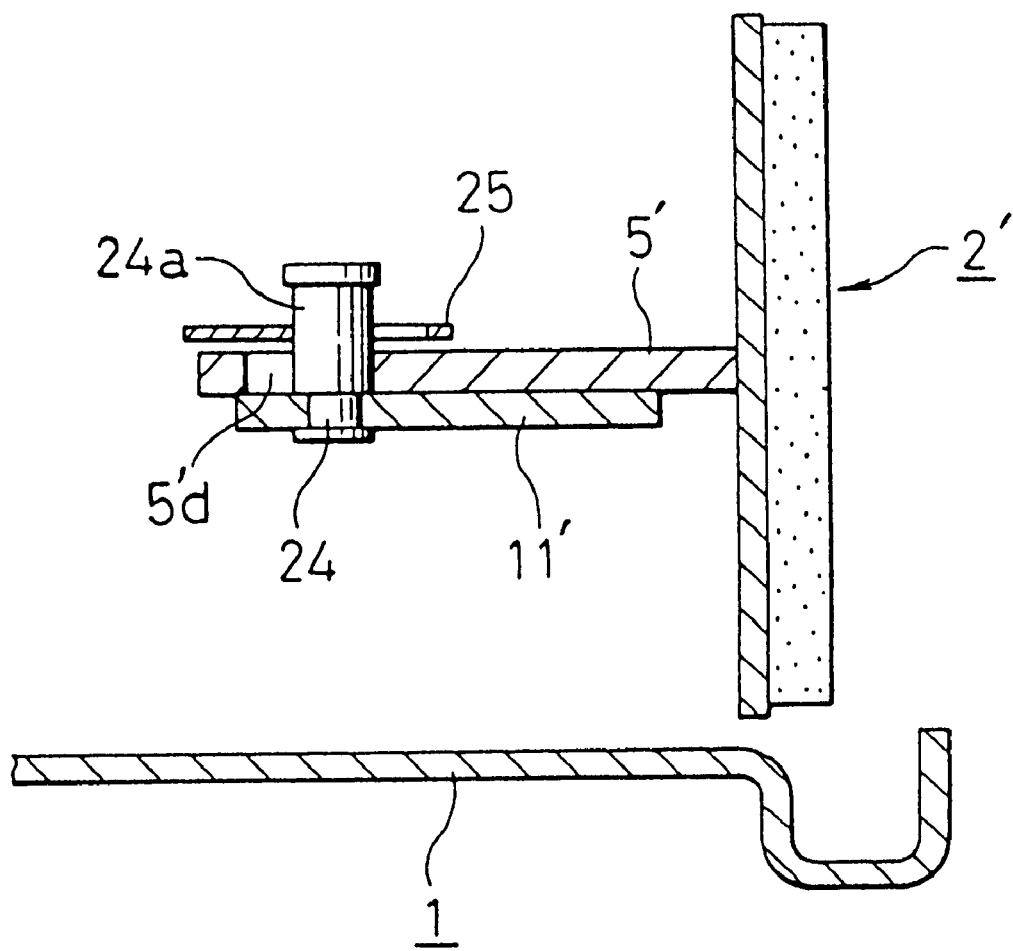
FIG. 10 is a cross section view of FIG. 9 taken along line X—X.

FIG. 9 and FIG. 10 illustrate Example 4, an another embodiment of this invention, in which a modification is added in a configuration essentially integrating the long link 11' and one brake shoe 2'. Those components which differ from the above-mentioned example are marked with an apostrophe. That is, whereas in the above-mentioned example, the lower face 11e of the long link 11 abuts against the anchor block 9, in this embodiment, as shown in detail in FIG. 10, the biasing force of the adjustment spring 26 keeps the outer brake side of the pin 24 abutting against the inner edge of the outer brake side of the long hole 5'd bored in the shoe web 5' of the one brake shoe 2'. The braking operation and automatic adjustment action of this configuration is the same as in the above-mentioned example, and an explanation is omitted here.

Figure 11:
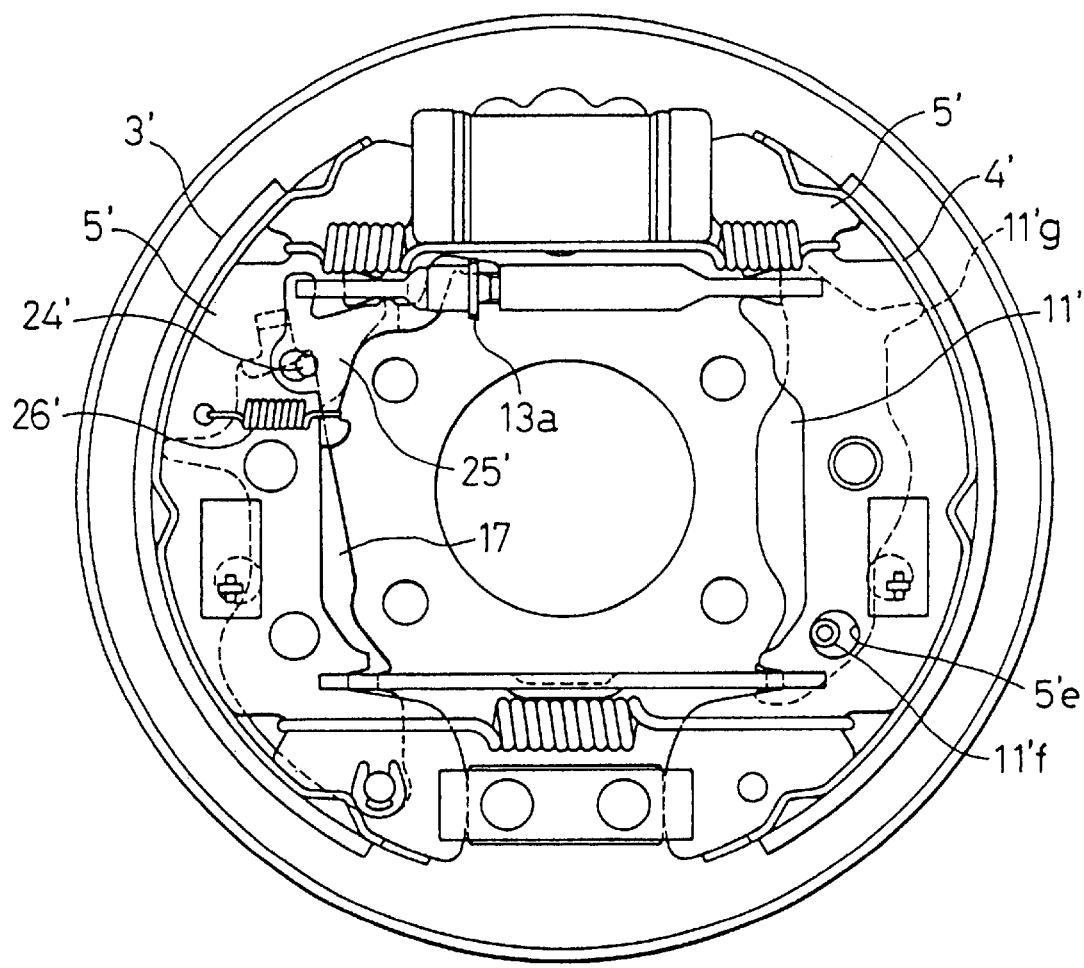
FIG. 11 is a plan view of the drum brake device of this invention as embodied in Example 4 and Example 5.

As shown also in FIG. 11, the same function can be obtained by providing a protuberance 11'f, provided on the other end of the long link 11', with the inner brake side of the large-diameter hole 5'c bored in the shoe web 5'; or by providing one back edge 11'g of the long link 11' with the inner face of the shoe rim 4'. What is essential is that when the service brake is applied, the long link 11' spreads open in tandem with the one brake shoe 2', and that when the parking brake is applied, the two components turn relative to each other.

With this configuration, even as the lining wears, the long link 11', adjustment lever 25, and adjustment spring 26 virtually move in tandem with the one brake shoe 2, thus having no effect on the automatic adjustment action to provide a stable adjustment function for a prolonged period.

EXAMPLE 5

FIG. 11 illustrates another embodiment of this invention, which discloses a modified automatic shoe clearance adjustment device.

That is, the above-mentioned device of Example 3 has been modified so as to be symmetrical about the axis through the center of the brake. Those components which have been changed from Example 3 are marked with an apostrophe, and a detailed explanation is omitted here.

The adjustment lever 25', is pivotable on the pin 24' protruding above the shoe web 5' of the other brake shoe 3', and is constantly energized to turn clockwise by the adjustment spring 26'.

The automatic adjustment action of this configuration is the same as in Example 3, and an explanation is omitted here. Moreover, the contacting point of the adjustment lever 25' and the toothed adjustment wheel 13a does not change even if the brake lever 17 is provided with only a slight pull, thus precluding any concerns about improper adjustment.

EXAMPLE 6

Figure 12:
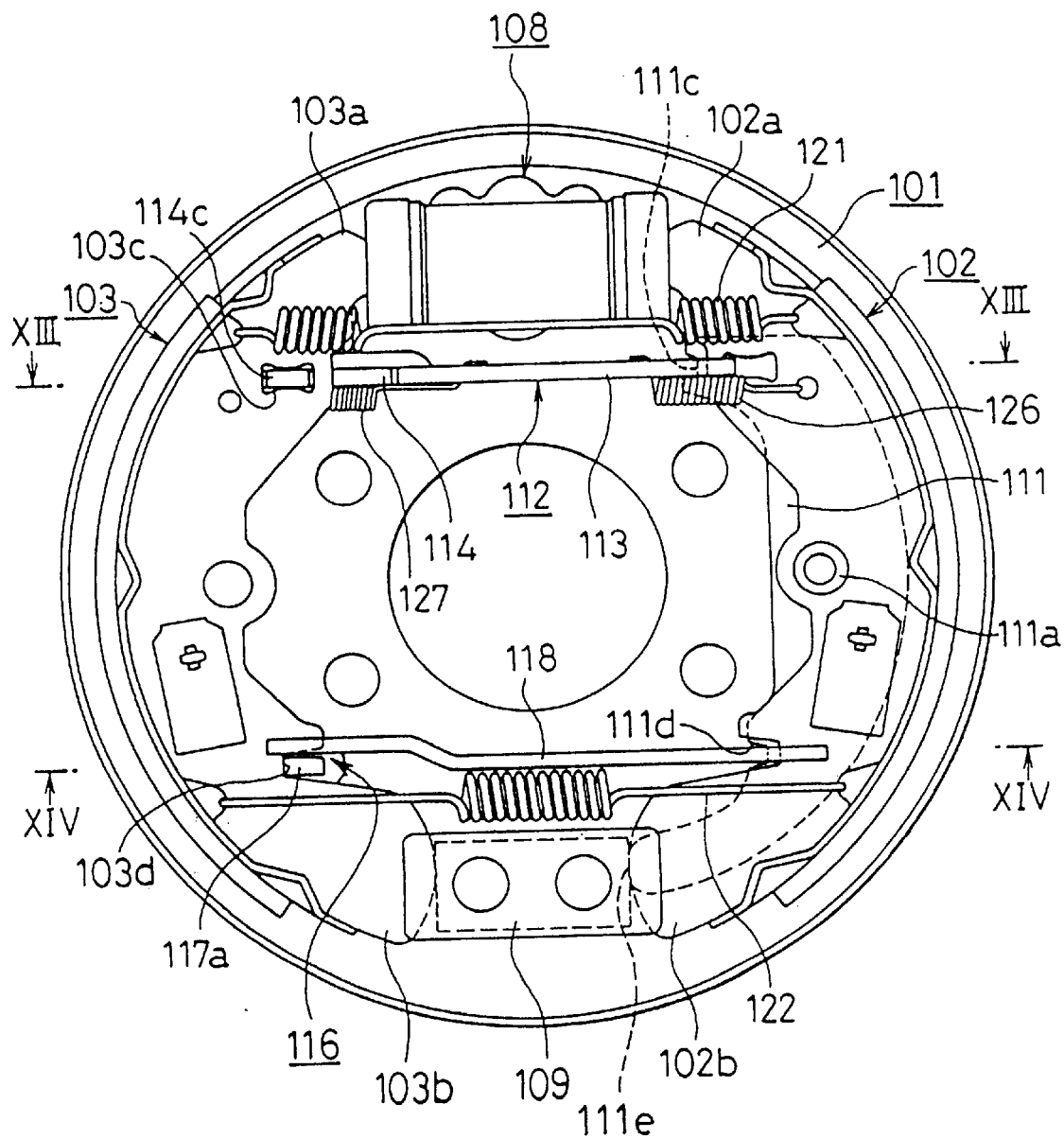
FIG. 12 is a plan view of the drum brake device of this invention as embodied in Example 6.
Figure 13:
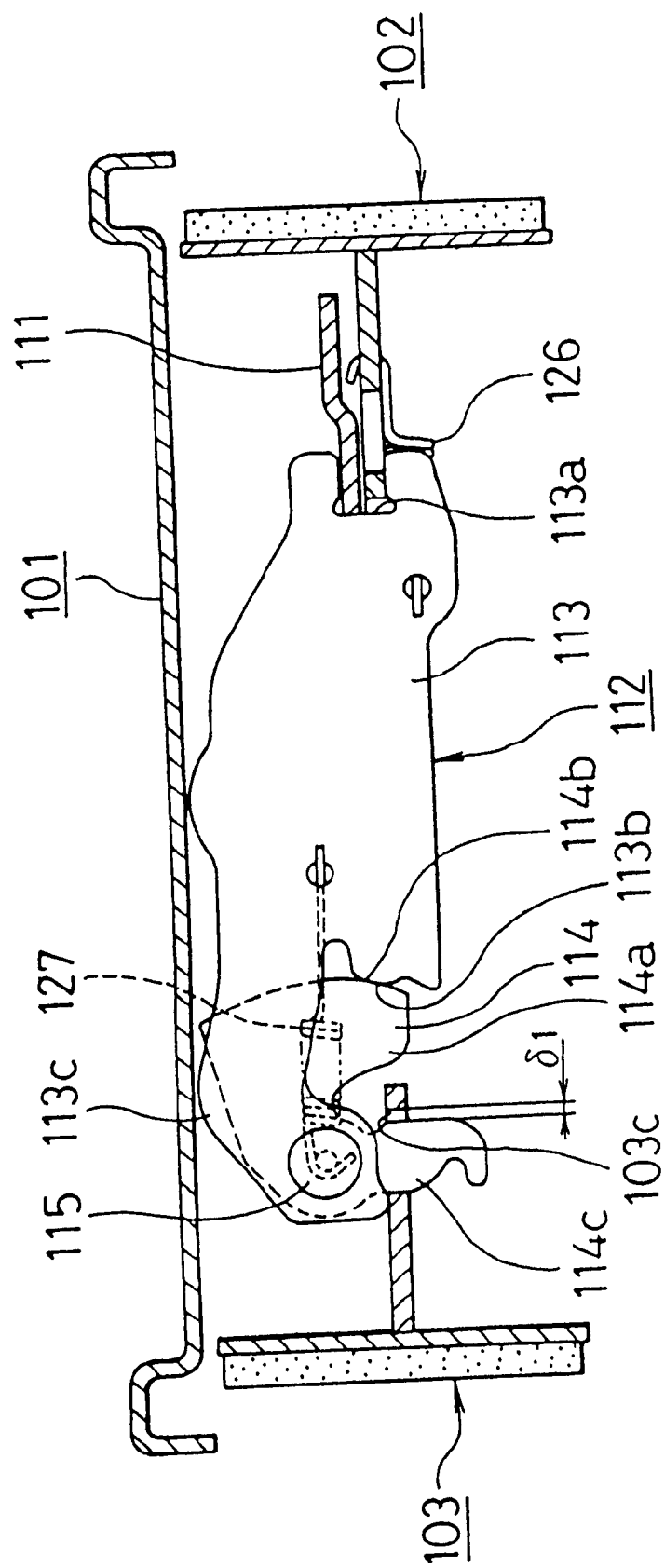
FIG. 13 is a cross section view of FIG. 12 taken along line XIII—XIII.
Figure 14:
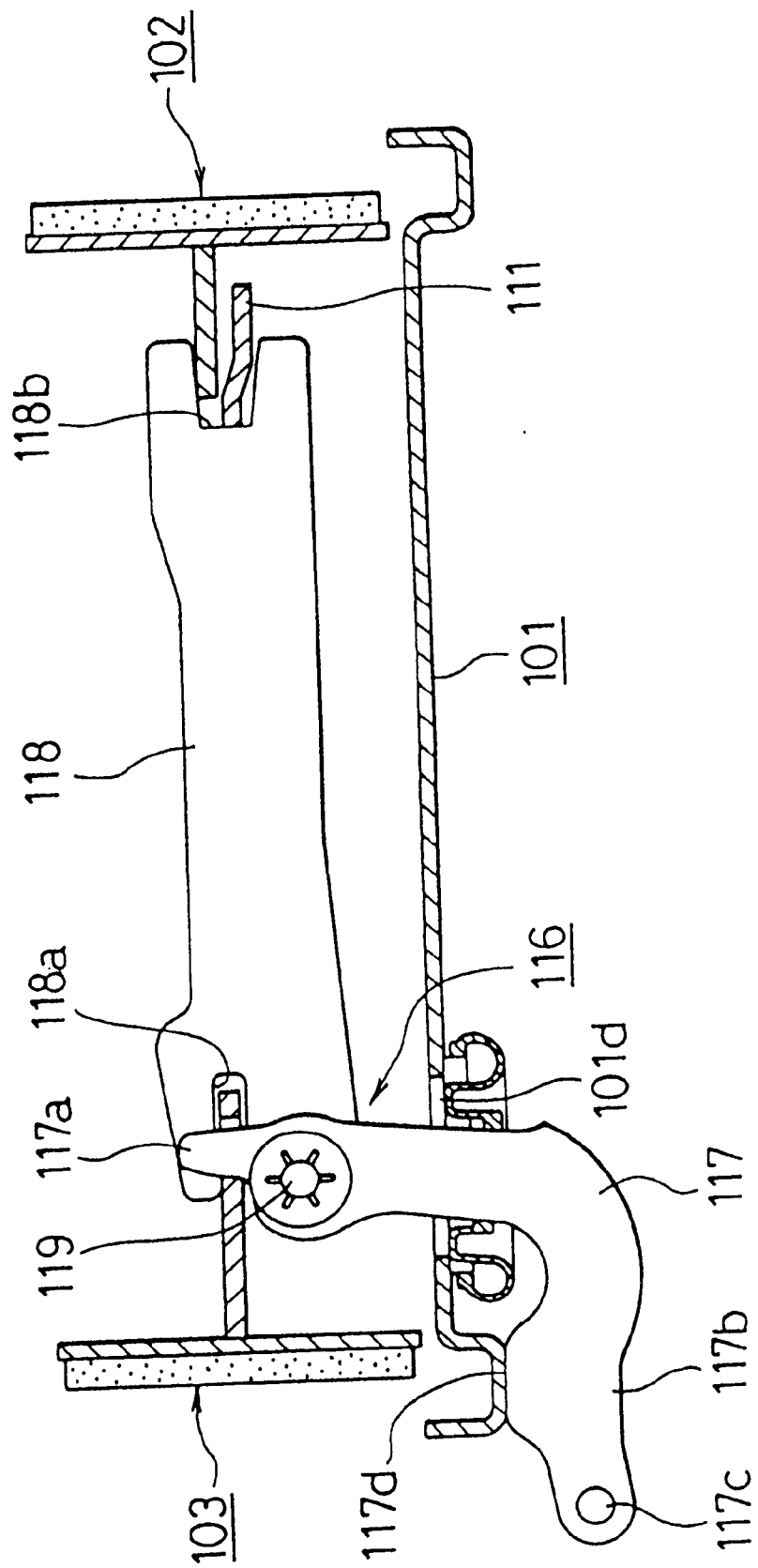
FIG. 14 is a cross section view of FIG. 12 taken along line XIV—XIV.
Figure 15:
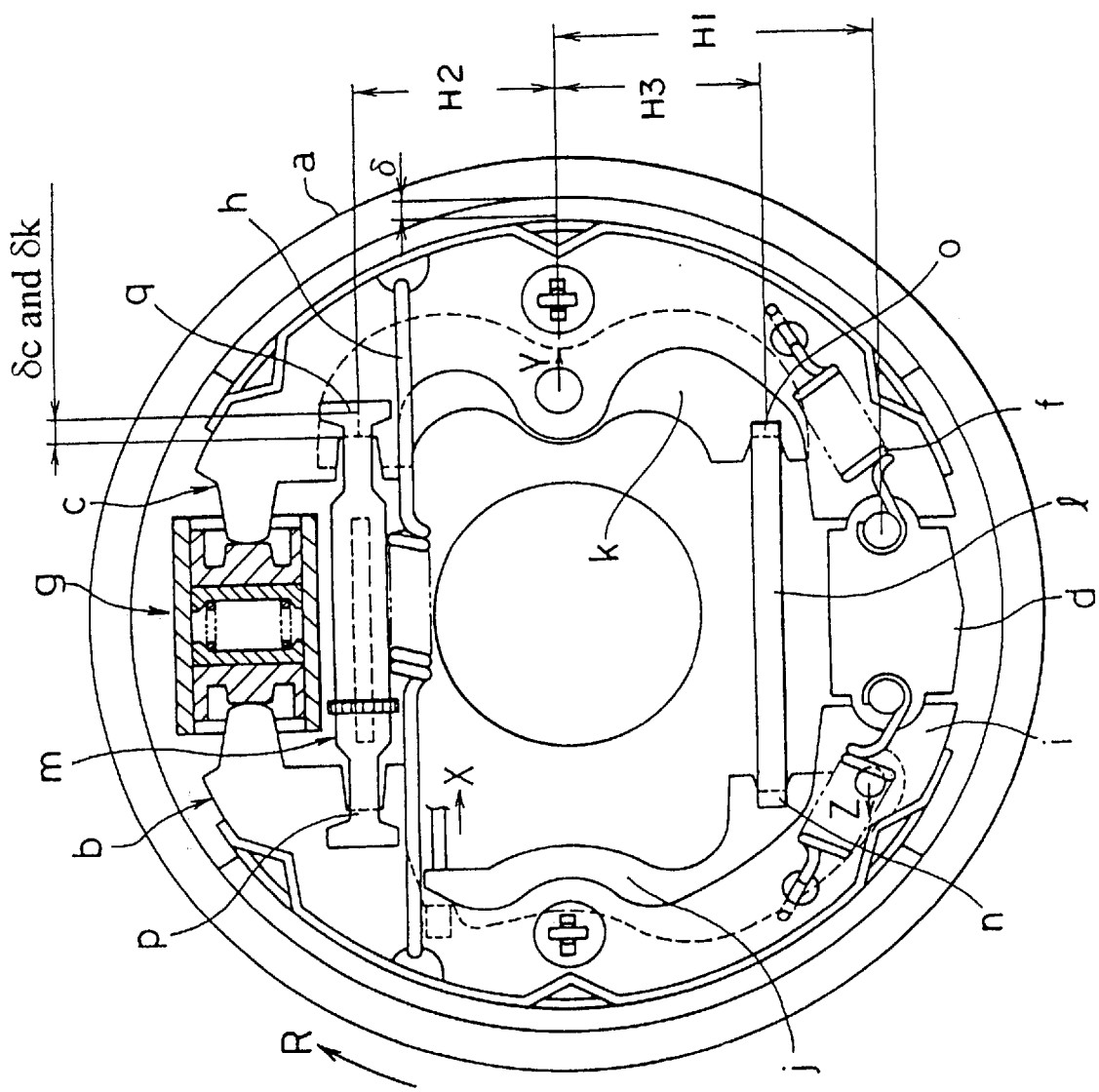
FIG. 15 is a plan view of the conventional drum brake device as disclosed in Australian patent number AU-B1-53 491/79, on which this invention was based.
Figure 16:
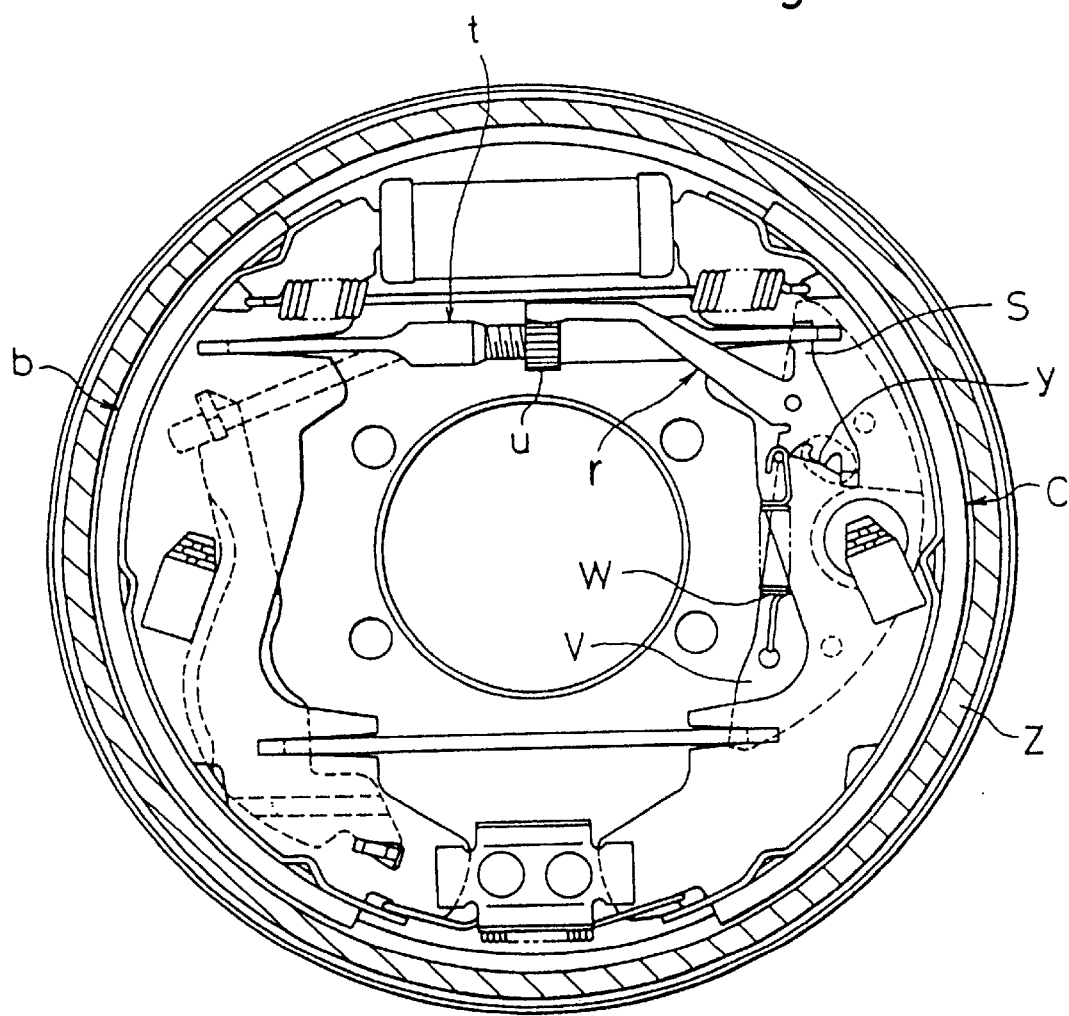
FIG. 16 is a plan view of the conventional drum brake device as disclosed in U.S. Pat. No. 5,275,260 on which this invention was based.

Example 6 is another embodiment of this invention shown in FIGS. 12–14, which is equipped with a one-shot type of automatic shoe clearance adjustment device for use when the service brake is applied, and a cross-pull type of parking brake. Those components, which are the same as in Example 1 and Example 2, are identified with a 100-series of numbers, for which a detailed explanation is omitted here.

As shown in FIG. 12, these components include the back plate 101, a pair of brake shoes 102,103 with one pair of adjacent ends 102a, 103a and the other pair of the adjacent ends 102b, 103b, the service brake actuator 108 activated when the service brake is applied, the anchor block 109, the long link 111 with a protuberance 111a, the notched groove 111c on one end, the notched groove 111d on the other end, and the bottom face 111e, the first return spring 121, and the second return spring 122. The mounted load of the first and the second return springs 121, 122 and their mounting position are selected such that when the parking brake is applied, the other ends 102b, 103b of the brake shoes 102, 103 do not spread open.

The automatic shoe clearance adjustment device 112 is configured from the plate adjustment strut 113, the bell crank lever 114, springs 126, 127, and others. The bottom of the notched groove 113a formed on one end of the adjustment strut 113 abuts against the bottom of the notched groove 111c on one end of the long link 111. Small, short teeth 113b are carved in the middle of the strut 113.

The middle segment of the bell crank lever 114 is supported by the stem of a pin 115 so as to pivot on the other end 113c of the strut 113 and to move lengthwise along the plate face of the strut 113. A fan-shaped arm 114a on one end of the bell crank lever has small, short teeth 114b carved around its perimeter which mesh with the small short teeth 113b of the strut 113. The other arm 114c with a cam face is positioned with a clearance of δ1 in the rectangular hole 103c formed in brake shoe 103.

An adjustment spring 126 is stretched between the brake shoe 102 and the adjustment strut 113. Another spring 127 is stretched between the adjustment strut 113 and the pin 115. The mounted load of the adjustment spring 126 is provided to be greater that than of spring 127.

A cross-pull type of actuator 116, activated when the parking brake is applied, is configured from the brake lever 117, strut 118, and other components. The finger-shaped segment 117a on one end of the brake lever 117 abuts against the bottom of the notched groove 103d formed on the other end of brake shoe 103. The arm 117b on the other end of the brake lever 117 penetrates freely through the hole 101d in the back plate 101. A mounting hole 117c for connecting the remote control cable (not shown in the diagram), is bored on the reverse L-shaped end of the arm 117b. A protuberance 117d is also formed on the brake lever 117, and abuts against the reverse side of the back plate 101 to regulate the return position of the lever, but the invention is not restricted to this configuration.

The strut 118 has a notched groove 118a formed on one end which holds the other end of brake shoe 103. The middle segment of the brake lever 117 is also pivotable by the pin 119 at this end. Another notched groove 118b is also formed on the other end of the strut 118 and includes the notched groove 111d on the other end of the long link 111 and one brake shoe 102.

The action of this embodiment when the service brake is applied is the same as that of the embodiment of Example 1, and when the parking brake is applied, the only difference is that the brake lever 117 has been changed to a cross-pull type. That is, when the mounting hole 117c of the brake lever 117 is pulled by the remote control cable, (not shown in diagram), the brake lever 117 presses against the strut 118 by the pin 119 with the point of abutment with the brake shoe 103 as the fulcrum. The force of this action is transferred in sequence to the long link 111, automatic shoe clearance adjustment device 112, and finally the rectangular hole 103c of the other brake shoe 103, wherein the one end 103a of brake shoe 103 opens, with the other end 103b as the fulcrum, and engages with the brake drum.

Next, the action force is imparted towards the outer side of the brake onto the protuberance 111a of the long link 111 with the point of abutment with the adjustment strut 113 as the fulcrum, wherein the one end 102a of brake shoe 102, with the other end 102b as the fulcrum, also opens and engages with the brake drum.

As is clearly evident, the movements of both brake shoes 102, 103, when either the service brake or parking brake is applied, is the same as for the previous embodiments, and the same effectiveness in operation can be obtained.

When the service brake is applied and the two brake shoes 102,103 spread open, the automatic shoe clearance adjustment device 112 receives the action force of the adjustment spring 126 and trails the one brake shoe 102. At this point, if the linings 6,6 are eroded, and the amount by which the shoes have opened exceeds the total of the clearance δ1 of the bell crank lever 114 plus the height of the small short teeth 114b, then the bell crank lever 114 turns, with the pin 115 as the fulcrum, such that the automatic shoe clearance adjustment device 112 is extended by an amount equivalent to one tooth only to close the gap with the brake drum.

When the parking brake is applied, the only action is that the adjustment strut 113 and the bell crank lever 114 move in tandem with the other brake shoe 103 to the left, and the adjustment spring 126 extends to move the one brake shoe 102 to the right as shown in FIG. 12. Thus, there is no effect on the automatic adjustment action.

This invention is not, by any means, limited to the aforementioned embodiments. For example, an incremental type of automatic shoe clearance adjustment device can be combined with a cross-pull type of parking brake; or a one-shot type of automatic shoe clearance adjustment device can be combined with a forward-pull type of parking brake. other examples include superimposing the long link 11, 11', 111 on that face of the show web 5 on which the brake drum is mounted. The possibility of many other variations should be evident to those people technically skilled in this industry.

As is evident from the aforementioned configurations, this invention provides the following advantages.

By regulating the long link to turn in one direction with respect to the brake shoes, its engaging point with the shoe clearance adjustment device can be easily observed by a temporary assembly of the link and the brake shoe.

An adjustment spring and other components that affect the automatic shoe clearance adjustment device move in tandem with the brake shoes. This ensures a constant clearance between the brake drum and the brake shoes, even as the linings wear out.

The ends of the brake shoes on the anchor block side can be prevented from opening solely and easily by a proper setting of the mounting loads of the shoe return springs and their positions.

The brake shoes do not separate from the anchor block, even when the parking brake is applied, in which case no noise is generated even when a torque is generated on the brake drum, thus eliminating any discomfort or anxiety for the driver.

No impact load is applied to the anchor block, hence the strength of its periphery can be reduced to make the device lighter.

The adjacent ends will not be separated from the anchor block even in the situation that the brake lever is not set in its return position precisely, thereby avoiding the unusual dragging between the lining and the drum brake or the wheel being locked when the brake shoe bites the brake drum.

The invention is applicable to a wide range of parts configurations; for example, an incremental type or one-shot type of automatic shoe clearance adjustment device can be used, or a forward-pull or cross-pull type of parking brake device can be used in any number of combinations.

It is readily apparent that the above-described has the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What we claim is:

1. A drum brake device comprising:
   a back plate;
   two brake shoes that face each other, said brake shoes provided on top of said back plate;
   a service brake actuator located on said back plate between a first pair of adjacent ends of said brake shoes;
   an anchor block located on said back plate between a second pair of adjacent ends of said brake shoes;
   a shoe clearance adjustment device adjacent to said service brake actuator provided between said brake shoes;
   a parking brake actuator adjacent to said anchor;
   a long link having middle segment that pivotably mounts said long link at a pivot point on a middle of one brake shoe, a first end of said link and a second end of said link that abuts said anchor, respectively, functionally engage said shoe clearance adjustment device and said parking brake actuator; and
   an elastic means for operating said long link in tandem with said one brake shoe when the service brake is applied.

2. A drum brake device as claimed in claim 1, in which the other end of said long link is energized to engage with the anchor so that said long link operates in tandem with said one brake shoe when the service brake is applied.

3. A drum brake device as claimed in claim 1, in which a torque with the pivot component of the long link as the fulcrum is imparted by an adjustment spring in the same clockwise direction in which the one brake shoe opens with the anchor block as the fulcrum, and a means which regulates the rotation in which the link pivots is provided between the link and the one brake shoe.

4. A drum brake device as claimed in claim 1, wherein with the pivot point in a middle of the long link as the fulcrum, the resistance to spread open the second adjacent end of brake shoes is greater than the resistance to spread open the first adjacent end of brake shoes.

5. A drum brake device as claimed in claim 4, wherein the moment applied to the second adjacent ends of the brake shoes, which is a combination of the force of a second shoe return spring and the distance from said pivotal mount of said brake shoe with said link to said second shoe return spring, is greater than the moment applied to the first adjacent ends of the brake shoes, which is a combination of the face of said first shoe return spring and the distance from said pivotal mount to said first shoe return spring.

6. A drum brake device as claimed in claim 4, wherein said shoe return spring means comprises a shoe return spring which engages and urges both brake shoes together at a position between the central region of the brake shoes and the second adjacent ends.

7. A drum brake device as claimed in claim 1, in which said shoe clearance adjustment device senses an amount by which said pair of brake shoes has opened and automatically adjusts the clearance between the brake shoes and a brake drum.

8. A drum brake device as claimed in claim 1, wherein a protuberance is integrally press-formed on the long link or the central region of one brake shoe at said pivot point and is pivotally engaged in a hole respectively bored at said pivot point in said one brake shoe or said link.

* * * * *